United States Patent [19]

Melville et al.

[11] Patent Number: 5,452,674
[45] Date of Patent: Sep. 26, 1995

[54] SHIP STABILISER AUTOMATIC GAIN CONTROL SYSTEM

[75] Inventors: Robert G. A. Melville; George McMeel, both of Edinburgh, Scotland

[73] Assignee: Vickers PLC., United Kingdom

[21] Appl. No.: 167,904

[22] PCT Filed: Jun. 24, 1992

[86] PCT No.: PCT/GB92/01139
§ 371 Date: Jan. 18, 1994
§ 102(e) Date: Jan. 18, 1994

[87] PCT Pub. No.: WO93/00255
PCT Pub. Date: Jan. 7, 1993

[30] Foreign Application Priority Data

Jun. 26, 1991 [GB] United Kingdom ............... 9113784

[51] Int. Cl.⁶ .................................................. B63B 39/00
[52] U.S. Cl. .................................................. 114/122
[58] Field of Search ........................... 114/144 E, 122

[56] References Cited

U.S. PATENT DOCUMENTS

3,727,572  4/1973  Nelson et al. ................... 114/122
4,380,206  4/1983  Baitis et al. ..................... 114/122

*Primary Examiner*—Jesus D. Sotelo
*Attorney, Agent, or Firm*—Gifford, Krass, Groh, Sprinkle, Patmore, Anderson & Citkowski

[57] ABSTRACT

An improved fin stabilizer control system which has an automatic gain control (AGC) system which uses the difference between the control laws demand signals and the actual fin angles to calculate a gain factor to reduce the control laws demand until the non-linearities almost disappear. If more than one control law is used to generate a demand, the control laws can be prioritized and the available actuator power thus rationed. In particular, the automatic gain control (AGC) sub-system of the control law monitors the motions of the fins and detects when each fin is not following the control law demands. It adjusts the gain of the control law so as to reduce the slew rate limit and the fin angle limit effects. Although the automatic gain control (AGC) sub-system has the effect of reducing the control law loop gain, it reduces the ship motions below those achieved with a conventional control law because the phase lag between the demanded and actual fin angles is reduced and because generation of harmonics of the demanded fin angle is much reduced.

13 Claims, 6 Drawing Sheets

```
Greatest := 0
for ( actuator 0 to m-1)
 if (error (actuator) > greatest) then
   greatest := error (actuator)
```

SHIP STABILISER AUTOMATIC GAIN CONTROL SYSTEM

The present invention relates to a system for stabilising the movement of ships or floating vessels. In particular the invention relates to a fin stabiliser control system for use with ships.

A fin stabiliser control system is used to control stabilisers of a ship in order to reduce ship motions. For monohulls, because of the forces and moments required, roll stabilisation only is normally used. For semi-submersibles, catamarans, or SWATH (Small Water-Plane Area Twin Hull) vessels control of other motions such as pitch or heave may also be practical.

Usually fins and their associated actuation systems exhibit two major non-linearities; slew rate limiting and fin-angle limiting. The first non-linearity; slew rate limiting, occurs because the actuation systems are only capable of drive the fins up to some finite rate. This rate may vary with the fin angle. The second occurs if the fin is operated above a certain angle, when "stalling" of the fin occurs.

This behaviour adversely affects control law performance and this can be exacerbated if the non-linearities generate intermodulation (coupling) between multiple control laws.

Existing stabiliser controllers employ fixed gain. This means as sea disturbances increase, the fin demand increases until it is limited. Under severe overload the fin spends its time either at the nose-up or nose-down limit position or slewing at its maximum slew rate between the nose-up and the nose-down limit positions. Because the maximum fin slew rate is finite, the effect when slew rate limiting occurs is that the fin position is delayed with respect to the fin demand. The slower the slew rate, the more pronounced this effect. The delay has the effect of reducing the effectiveness of the roll stabiliser control loop by introducing a phase delay, and the effectiveness of control law reduces rapidly with increasing phase delay.

There are two possible ways of dealing with this problem. The first way is to ensure that the maximum slew rate of the fin is such that the phase delays introduced for all reasonable disturbances are low enough not to matter. This has the advantage of simplicity, but the disadvantage what the drive system must be powerful enough, and provide sufficient torque, to provide the requisite slew rates.

The second way is to reduce the controller loop gain so that the fin slew rate is never exceeded and the nose-up and nose-down limits are never reached. However, as the control gain is reduced, the non-saturated roll reduction reduces as well. In this situation the principal advantage is that the drive system, power and torque capability may be reduced considerably when compared with the first potential solution.

In designing a suitable fin stabiliser controller, the main points to consider are the relative fall off in performance in the two types of potential solution with increase in disturbances for a given drive system power and torque capabilities, and also the trade off between performance and cost. In this regard, it is desirable to reduce the cost of the drive system whilst not comprising the roll reduction achieved.

An object of the present invention is to provide an improved fin stabiliser control system which obviates or mitigates at least one of the aforementioned disadvantages.

This is achieved by providing an automatic gain control system which uses the difference between the control laws demand signals and the actual fin angles to calculate a gain factor to reduce the control laws demand until the non-linearities almost disappear.

If more than one control law is used to generate a demand, the control laws can be prioritised and the available actuator power thus rationed. In particular, the automatic gain control (AGC) sub-system of the control law monitors the motions of the fins and detects when each fin is not following the control law demands it adjusts the gain of the control law so as to reduce the slew rate limit and the fin angle limit effects. A control law is a physical realisation of a mathematical equation which continuously generates actuater demands in response to error inputs in order to achieve the desired motion or position characteristics of an object, in this case the fin or fins. The control law may be identical in structure to current control laws or of a different structure provided that it can accommodate changes to the loop gain.

Although the automatic gain control (AGC) sub-system has the effect of reducing the control law loop gain, it reduces the ship motions below those achieved with a conventional control law because the phase lag between the demanded and actual fin angles is reduced and because generation of harmonics of the demanded fin angle is much reduced.

The AGC sub-system solves the two basic problems. It firstly measures the level of slew rate limiting and/or fin angle limiting by subtracting the demanded fin angle from the actual fin angle and the absolute value of the result is compared with the corresponding absolute values calculated from all other fins the stabilisation system, and the largest of these values is selected and filtered to produce an overload measurement. The filter used may have different "attack" and "decay" times. Therefore, if an overload occurs it may cause a rapid increase in the overload measurement, while if such an overload is removed the return to lower overload measurements is much slower. This prevents overload from being present for long periods while preventing rapid modulations of control law gain.

The overload measurement is then converted to a gain which is varied from some maximum (for no overload), to a selectible minimum (for large overloads). In practice, the minimum is set to a suitable value (for example 30% of the maximum) so that the control law gain is not excessively reduced and the slope of the gain against overload is made variable to allow the AGC sub-system to be tuned for a particular configuration. The control law fin angle demand is then multiplied by the gain value calculated above to derive the actual fin angle demand.

For fin stabilisers, the instantaneous power consumption is proportional at high slew rates to the square of the slew rate. Thus the AGC controller can reduce the average power consumption by reducing the amount of time the fin operates at high slew rates. Alternatively, it will be understood that the AGC controller can be used with lower slew rate fins. This slew rate can be selected to provide the same performance levels as current fins with conventional controllers, but with much lower average and peak Dower consumption.

According to one aspect of the present invention there is provided a vessel motion stabilisation system for stabilising at least one motion of a vessel having a plurality of actuatable vessel stabilising elements, said stabilising system comprising:

motion sensing means for sensing a parameter representative of the vessel motion to be stabilised, control law means for receiving said motion signal and for processing said motion signal to provide an unlimited stabilising element demand signal, automatic gain control means for receiving a signal representative of said unlimited control law demand signal and for receiving a signal representative of said actual stabilising element condition, said automatic gain control element including means for comparing the unlimited demand signal with the actual demand signal and providing an error value, and signal processing means for processing said error value to provide automatic gain control value, means for combining the gain control value with the unlimited demand signal to provide a limited or actual demand signal for controlling the motion of said motion stabilising element.

Preferably, said automatic gain control means includes absolute error detecting means for determining the absolute error between the stabiliser demand signal and the actual stabiliser signal, and filter means coupled to the output of the absolute error detecting means to provide a filtered response loop gain control means for receiving the output of the filter means for limiting the loop gain of the control unit to a value between a maximum and a minimum.

Conventionally the vessel is a ship and the vessel stabilising elements are fins which are hydraulically or electrically actuatable. The fin motion detecting elements are preferably accelerometers, rate sensors or angle sensors, and the motion controlled is the roll motion of the ship.

Preferably, said loop gain control means limits the maximum demand angle to a pro-determined value, for example, plus or minus 25°.

According to another aspect of the present invention there is provided a vessel stabilising system for stabilising the motion of a vessel, the vessel having a plurality of vessel motions to be controlled simultaneously, and the vessel having a plurality of actuatable vessel stabilising elements, each vessel stabilising element having position or motion sensing means for providing an output signal representative of the position or motion of the stabilising element, said vessel stabilising system comprising:

signal weighting means coupled to said motion sensing means for receiving said output signals representative of the position or motion of said stabilising elements, said weighting means including means for weighting the proportion of available power to be set for a particular vessel motion control law according to pre-determined criteria, error detecting means coupled to each stabilising element for receiving and coupling a demand signal and an actual signal from each vessel stabilising element and for providing an error signal, error signal comparison means coupled to each of said error detecting means for receiving said error signals and for coupling said error signals and selecting the largest error signal as an output signal, output signals processing means for filtering and amplifying said output signal to provide a gain value between a maximum and a minimum, power allocation means coupled to the output of said weighting means and to said signal processing means to receive said weighted vessel motion components and said gain value, said power allocation means-including summing means for summing said weighted vessel motion components to provide a total value, and a plurality of vessel motion gain calculating means for determining respectively the gain of one of said respective vessel motions, said gain calculating means receiving said total value of the weighted components, the weighted component for a particular motion and the gain value between a maximum and a minimum, each gain calculating means providing a motion gain value which is fed to means to drive said motion stabilising element.

Preferably the vessel is a ship and the vessel stabilising elements are fins. Conveniently, there are four fins which are used by three control laws.

An accelerometer or other motion sensor provides the motion signal from each controlled motion. The motion signals are weighted in accordance with control laws for each motion which depend on the vessel and installation, specific criteria. Weighting is achieved by constants which are set at the design stage. The constants can be changed in-situ to meet changing performance requirements.

Conveniently, the maximum is 1.0 and the minimum is zero.

According to another aspect of the invention there is provided a method of controlling at least one motion of a vessel using a vessel stabilising system, the vessel having a plurality of vessel motions and vessel stabilising elements, said method comprising the steps of, providing an automatic gain control unit to monitor a signal representative of the motion of each stabilising element to be controlled and coupling the signal with a desired motion, and adjusting the gain for each motion signal by reducing the gain to a level which the stabilising element can achieve.

Preferably the method includes controlling a plurality of vessel motions by monitoring signals representative of the motions of each stabilising element, and processing signals representative of each motion to generate weighted gain values and drive said stabilising elements to minimise said vessel motions.

These and other aspects of the invention will become apparent from the following description when taken in combination with the accompanying drawings in which.

Figure 1:
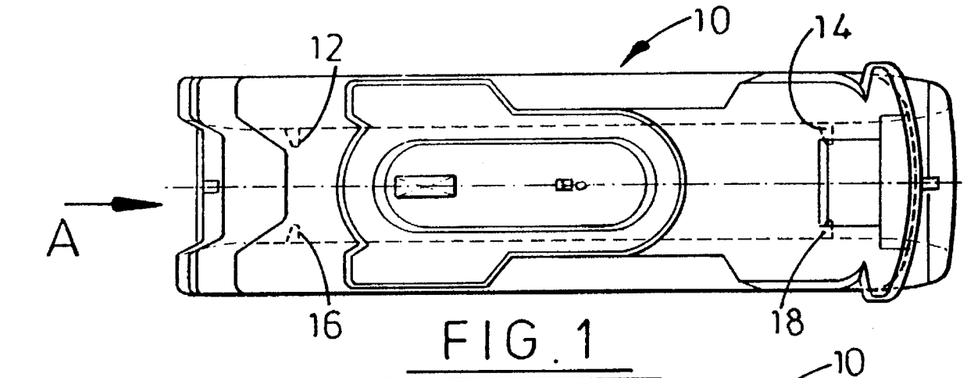
FIG. 1 is a plan view of SWATH vessel with four stabilising fins which require to be controlled by the automatic gain fin stabiliser controller in accordance with an embodiment of the present invention.
Figure 2:
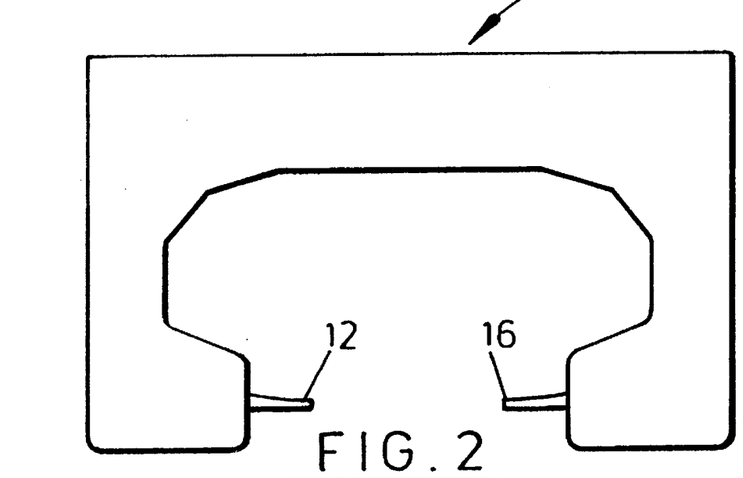
FIG. 2 is an enlarged end view of the Swath shown in FIG. 1 taken in the direction A.

Reference is first made to FIGS. 1 and 2 of the drawings which depicts a plan view of a SWATH, generally indicated by reference numeral 10, which has four identical moveable fins 12, 14, 16 and 18 located on the hull as shown. In the following description reference will be made to the control of one of these fins, although it will be appreciated that the control is applicable to all fins in an identical manner using the automatic gain control system of the present invention. Roll control is discussed initially to simplify understanding and the heave and pitch control is discussed in the fin stabilisation system.

Figure 3:
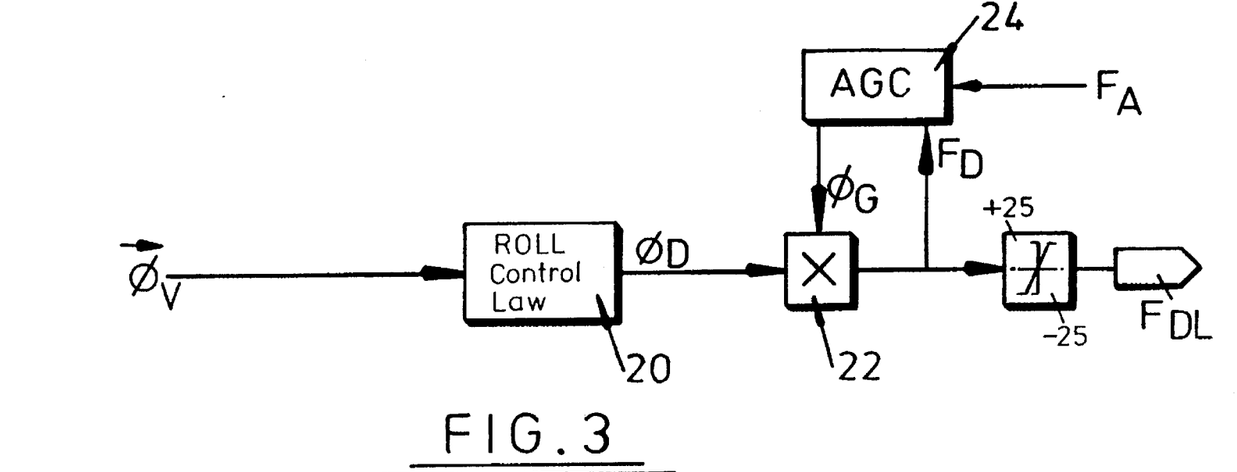
FIG. 3 is a schematic block diagram of the fin stabiliser control system used to produce a fin angle demand for roll control law.

Reference is now made to FIG. 3 of the drawings which is a block diagram of the roll control law for processing a vector of ship roll angle, roll velocity and roll acceleration to produce a fin angle demand. The roll control law will vary from vessel to vessel, but in its simplest form may be represented by velocity multiplied by a constant and implemented in hardware or software. It will be understood that in practice one or more of these components may be absent.

The vector, $Ø_V$, of ship roll acceleration velocity and angle is fed to the roll control unit 20 which is implemented in software. The output, $Ø_D$, of the unit 20 is fed to a multiplier 22 which is also implemented in software which multiplies $Ø_D$ by the gain value $Ø_G$, as will be described. The output of multiplier 22, the roll control law fin angle demand $F_D$, is fed to the automatic gain control (AGO) 24 and to a limit block 26, also implemented in software, which limits the fin angle demand $F_D$ to maximum working angle of the fin (e.g. 25°), designated $F_{DL}$, before being fed to the fin service system (not shown) which continuously attempts to place the fin at the demanded fin angle. Thus, it will be appreciated that the actual fin angle demand $F_{DL}$ is a scaled version of the roll control law angle demand $F_D$ with the scaling factor being determined by the AGC unit 24.

Figure 4:
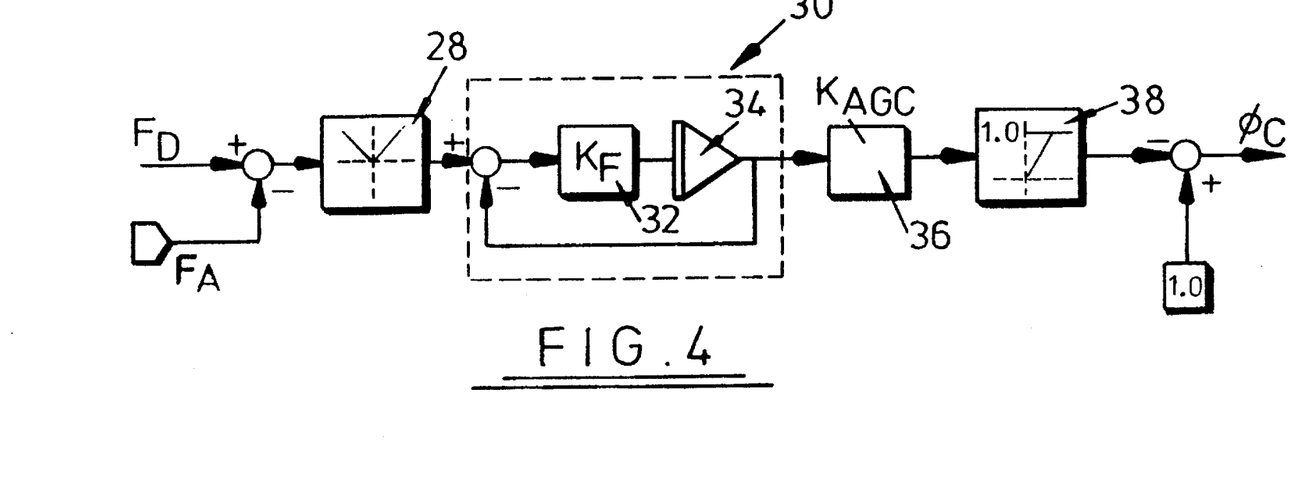
FIG. 4 is a schematic block diagram of the automatic gain controller used with the fin stabiliser control system shown in FIG. 3 for the roll control motion.

Reference is now made to FIG. 4 of the drawings which depicts the AGC unit 24 which monitors the difference between the unlimited fin angle $F_D$ demand and the actual fin angle $F_A$. The actual value $F_A$ is subtracted from the fin angle demand $F_D$ to provide an error value. If the actual fin angle $F_A$ limits or if the slew rate limiting occurs, then the error will increase. The absolute value of this value is taken by block 28, which is implemented in software, so that the sense of the error does not matter. The resulting absolute value is filtered in filter 30 so that the bandwidth of the control law gain adjustment can be tailored. Filter 30 consists of a filter loop having an AGC filter time constant unit 32 over an integrator 34. The time constant unit 32 has two time constants to provide a time-averaging asymmetric response to ensure that AGC operation is smoothed. Normally this bandwidth is considerably smaller than the control law bandwidth. The filtered value is a measure of the overload experienced by the fin and its actuation system over the last few cycles of operation. The filter 30 is implemented in software.

Once the overload measurement has been taken it is then multiplied by a gain $K_{agc}$ in software-implemented gain unit 36 which is used to tailor the loop gain of the AGC sub-system. The loop gain is then limited in a software-implemented limit unit 28 to between a minimum (0.0) and a maximum (1.0) and subtracted from 1.0 by the summation system indicated Thus, it will be appreciated that as the overload measurement gradually increases, the AGC gain value gradually decreases from 1.0 reaching 0.0 under extreme overload conditions.

It will be appreciated that the roll control law gain is varied according to the amount of difficulty of the fin and its actuating system have in following the roll control law demands.

Figure 5:
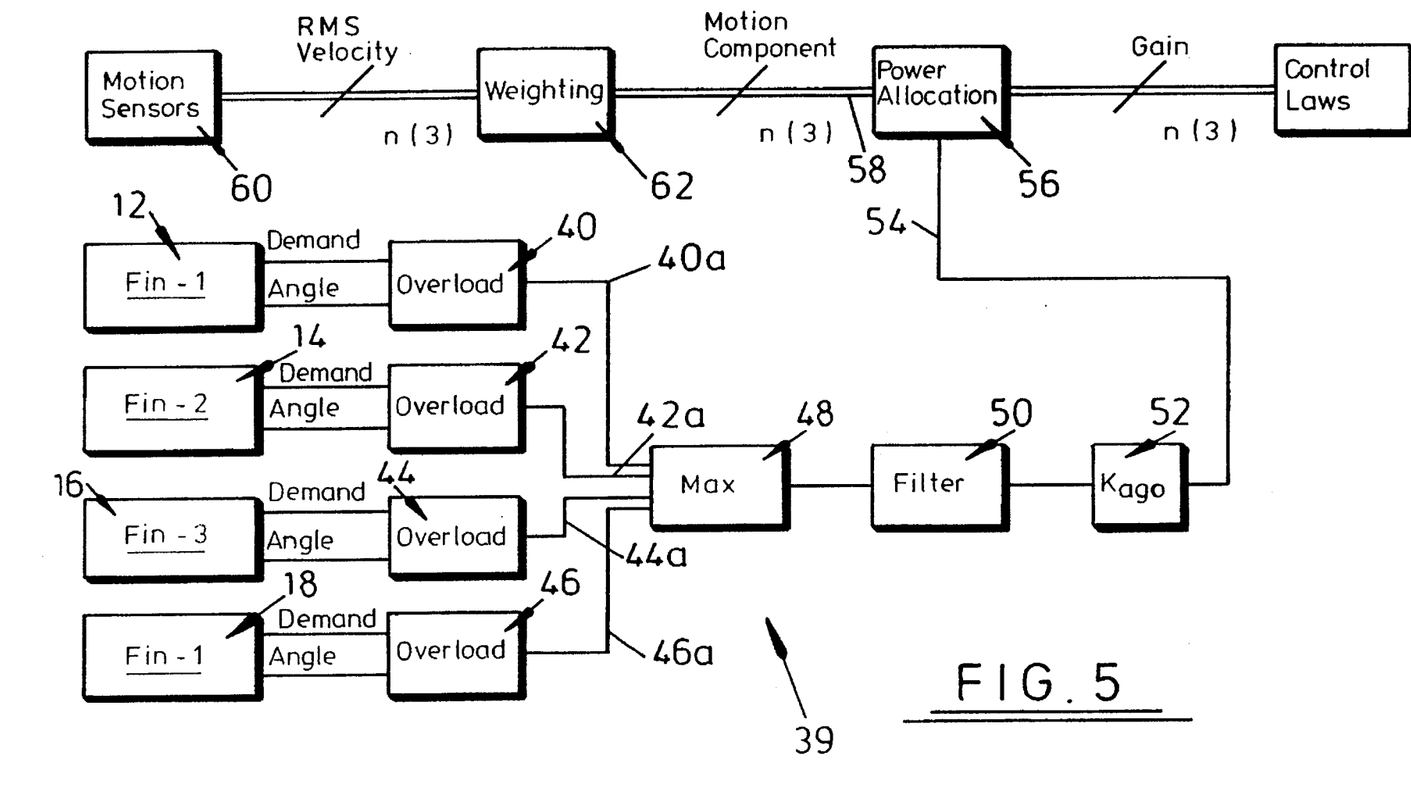
FIG. 5 depicts a block diagram of an automatic gain control system for the SWATH vessel in which 4 actuators are analysed to derive the gains for 3 control laws.

Reference is now made to FIG. 5 of the drawings which depicts a block diagram of an automatic gain controller 39 for use in a system where the 4 fins (actuators) of the Swath are analysed to derive the gains for 3 control laws to control roll, pitch and heave motions. The fins operate as opposed pairs to reduce the roll, pitch and heave. The AGC controller shown in FIG. 5 includes enhancements over those shown in FIGS. 3 and 4 to allow for individual selection of control laws and to cater for particular fins being unavailable.

The AGC system shown in FIG. 5 uses the difference between the control laws demand and the actual fin angles as described with reference to FIGS. 3 and 4 to calculate multiple gain factors to reduce the total control laws demand until the non-linearities almost disappear as will be described. If more than one control law is generating the demand, then the demands can be prioritised and the available actuator power can be rationed accordingly.

Still referring to FIG. 5, it will be understood that this Figure shows two logical halves: the lower half generates a single gain reduction factor $K_{agc}$ based on the fin position errors, and the upper half allocates fin power between the 3 control laws according to the weighted Swath vessel motions, as will be later described in detail.

Figure 6:
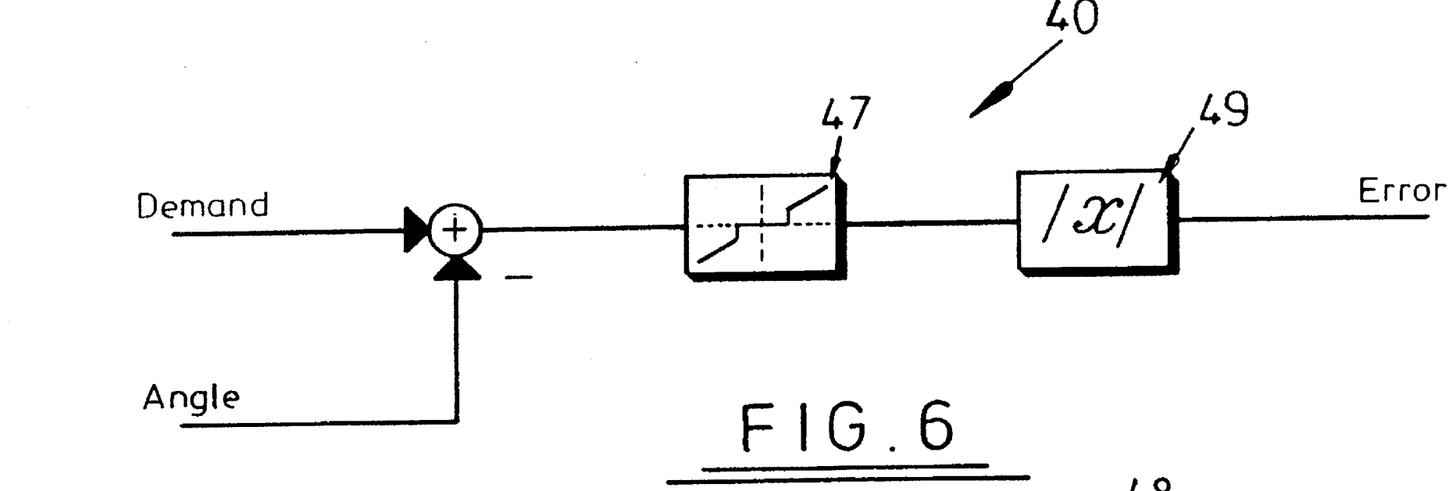
FIG. 6 is a schematic block diagram of an overload block shown in FIG. 5.
Figure 7:
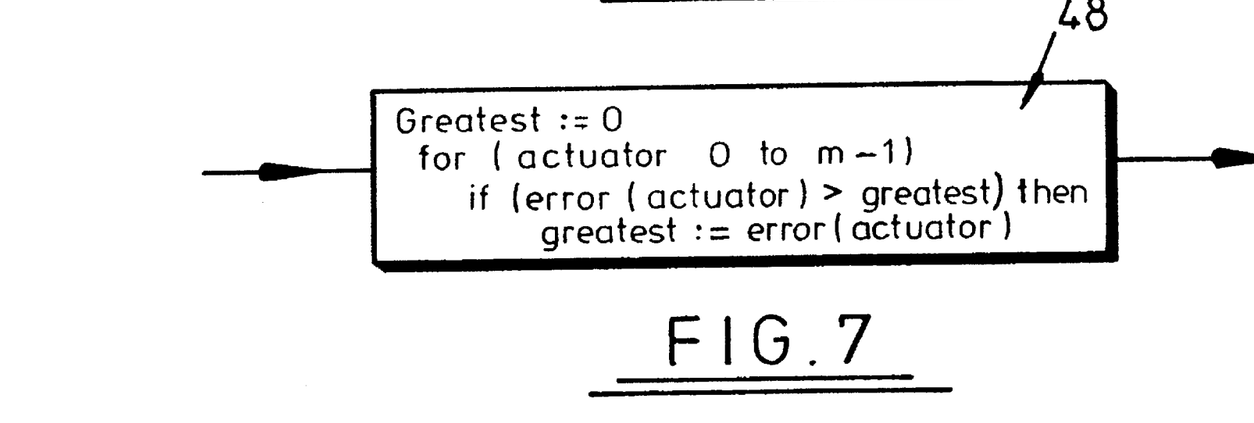
FIG. 7 is a more detailed diagram of the MAX-block shown in FIG. 5 which compares all of the error outputs of the overload blocks and detects the largest so that the AGC is always reacting to the worst case.
Figures 10, 11:
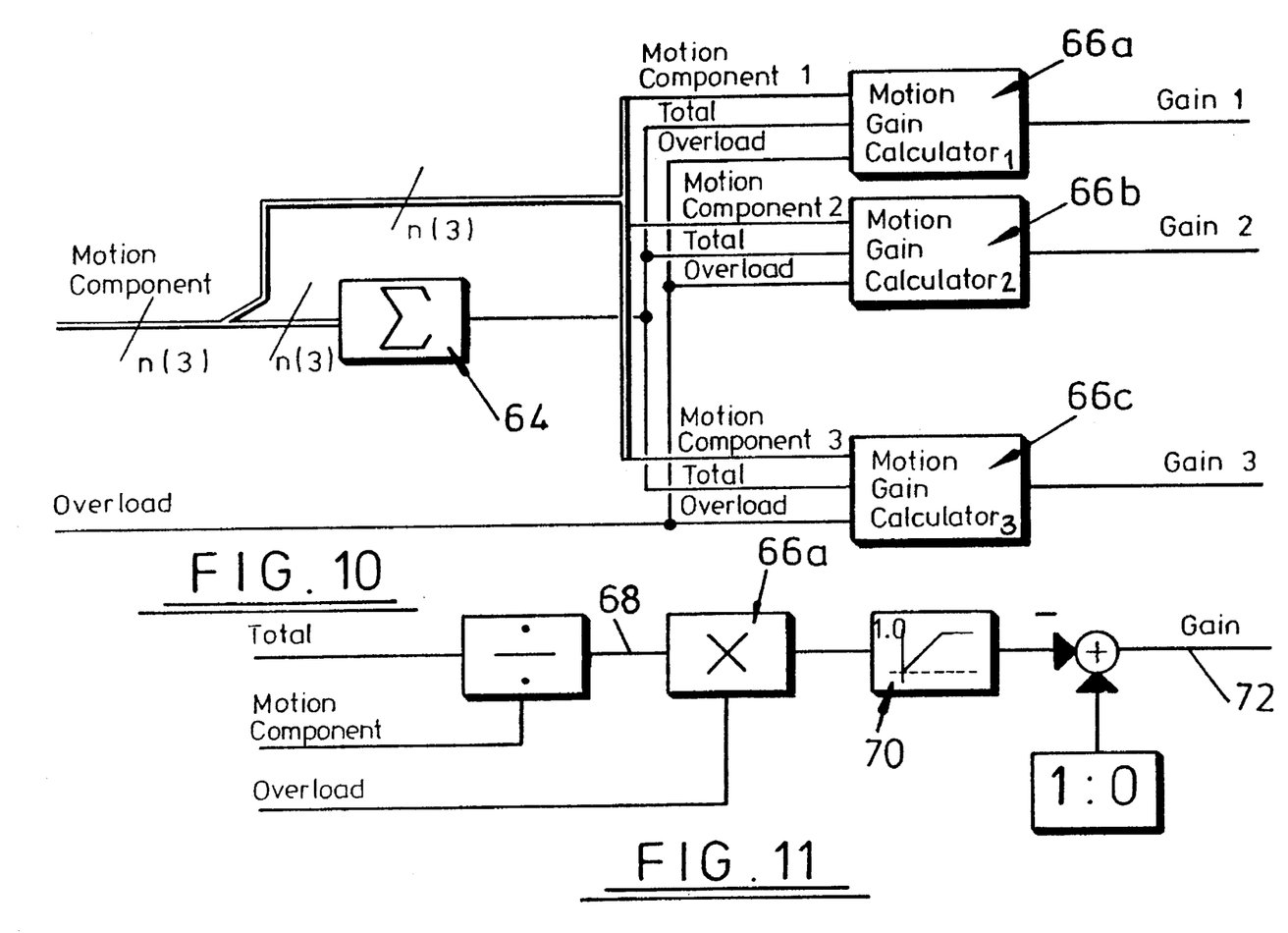
FIG. 10 depicts a schematic block diagram of the power allocator shown in FIG. 5 which sums all of the weighted motion components and passes the total to the gain calculator.
FIG. 11 is a schematic block diagram of the cain calculator shown in FIG. 10.

Each fin 10, 12, 14 and 16 produces a demand and an angle which is fed to a respective overload unit 40, 42, 44, 46 one of which is seen in FIG. 6. Each overload unit is implemented in software and subtracts the actual fin position from the desired position and passes the difference through a deadband unit 47 which sets the difference to zero if it is less than a predetermined deadband value (which is set depending on the application). This has the advantage in that it allows for transducer calibration errors. Once this has been achieved the absolute value of the difference is taken by block 49, i.e. the sign is discarded. The outputs 40a, 42a, 44a and 46a of each of the overload units is fed to a software-implemented block 48 designated MAX which compares all of the error outputs of the overload blocks and then selects the largest absolute error. This is so that the AGC 39 always reacts to the worst case. The largest error selected is fed to a filter 50 has a time constant unit 51 with two time constants similar to unit 32 and an integrator 53 which provides a time-averaging asymmetric (that is, a fast attack and slow decay) response to ensure that the AGC operation is smoothed. The output of the filter 50 is fed to the gain unit 52 $K_{agc}$ of the AGC gain controller. The value of K is chosen so that the greatest possible actuator error is converted to unity. The output of gain unit 52 varies in time from zero, when all of the fins are correctly responding to the control law demands, to 1.0 which occurs when one or more of the fins is at one end of its travel and the control law expects it to be at the other end. The output 54 from the gain unit 52 is fed to the power allocation block 56 which is best seen in FIG. 10.

The power allocation block 56 also receives another input 58, the three motion components, which originates from the motion sensors 60 which are accelerometers. The accelerometers provide signals which are integrated to give a time-averaged value (RMS) of velocity or other estimate of the relevant motion and the averaged values are fed to the weighting unit, generally indicated by reference numeral 62.

Figures 8, 9:
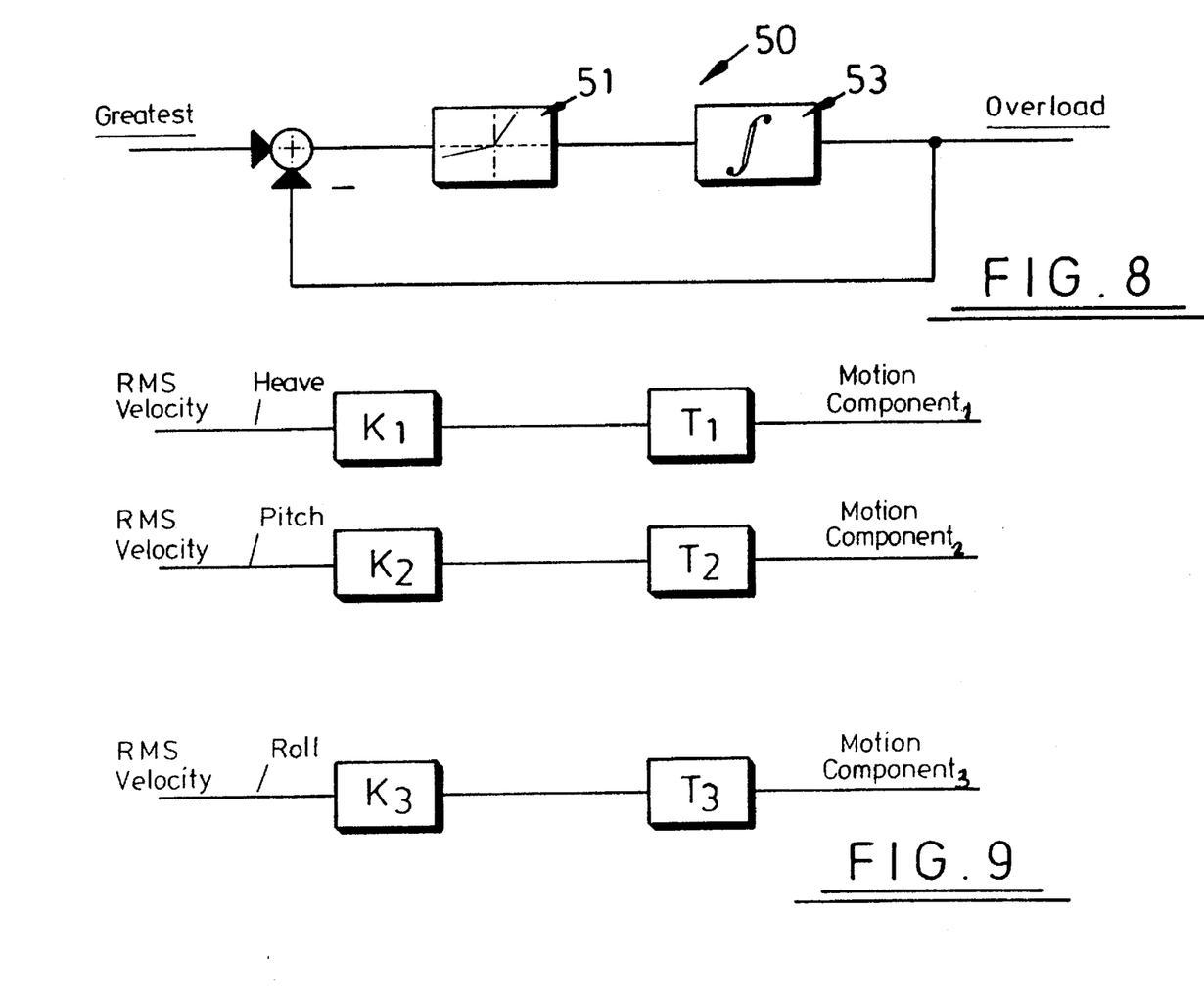
FIG. 8 is more detailed schematic block diagram of the filter shown in FIG. 5.
FIG. 9 is a schematic block diagram of the weighting system for allowing the proportion of available actuator power to be set for each control law.

The weighting unit, as shown in FIG. 9, allows a proportion of available actuator power to be set for each control law according to installation-specific criteria. For example, to reduce the probability of sea-sickness the vertical acceleration of passenger areas should be reduced. It will be understood that the worst case is any corner of the vessel where the lever arms due to roll and pitch were greatest.

Thus the velocity value from the roll sensor is multiplied by half the vessel beam ($K_{roll}$) and the pitch sensor outputs is multiplied by half the vessel length ($K_{pitch}$). Because lower vessel motion periods mean higher accelerations, velocity values are multiplied by the reciprocals of the periods. Therefore, if the vessel pitch is 10 seconds and the roll period is 20 seconds, then the multiplication values are $T_{roll}=0.05$ and $T_{pitch}=0.1$. It will be appreciated that additional concepts can be included to further fine tune the AGC performance. As seen in FIG. 9 the output of the weighting block generates three weighted motion components corresponding to roll, pitch and heave. These weighted components are fed to the power allocator shown in FIG. 10. The constants K,T are software-implemented and are set at the design stage, but can be varied on-site to suit particular sea or vessel requirements.

Reference is now made to FIG. 10 and it will be appreciated that the power allocator 56 receives all three of the weighted motion components which are summed in unit 64 to generate a total value which passed to each of three motion gain calculators 66a, b and c. The motion gain calculators 66a, b and c also receive the same overload signal, and each receives its respective motion component. This means that, for example, gain calculator 66a receives motion component 1, the total of the weighted motion components and the overload signal.

Each motion gain calculator 66a, b and c is identical and one 66a will be now be described with reference to FIG. 11. It is software-implemented and processes the three input signals by dividing the sum total by the motion component and then multiplying the output result 68 by the overload signal. The result of this multiplication is limited to 1 in a limit unit 70 and, as shown in FIG. 4, and the result is then subtracted from 1.0 to produce a particular AGC motion gain value 72. This is repeated for each motion gain calculator.

Thus, in summary it will be appreciated that the AGC sub-system of the control law monitors the motions of the fin and detects when the fin is not following the control law demands. It then adjusts the gain, by reducing it to a level that the fin can achieve, of the control law so as to reduce the slew rate limit and fin angle limit effects. The control law may be identical in structure to current control laws or of a different structure provided it can cope with having its loop gain changed from time to time.

It will be understood that in the case of the SWATH ship, more than one ship motion is controlled simultaneously. For example, pitch, heave and roll are all controlled simultaneously. This is achieved by firstly selecting the stabilisation criterion mixed with the contribution of a particular motion of the ship as measured with respect to the stabilisation criterion. For example, the vertical velocity due to roll at any point of the ship is the roll velocity times the lever arm from the centre of roll at the point at which the total vertical velocity is being assessed. Finally, the contributions are added together to provide a measure of total motion with respect to the stabilisation criterion. The relative gains of the control laws are then calculated as a ratio of the contribution from corresponding motion over the total motion. When this is achieved it is possible to weight the individual contributions before adding them together. This is used for instance, to compensate for coupling between different ship motions.

It will be appreciated that various modifications may be made to the embodiments hereinbefore described without departing from the scope of the invention. For instance, in a normal fin service system there are always errors between the actual and demanded angles. In order to prevent this reducing the gain of the roll control law unnecessarily, a small dead band can be introduced immediately after the absolute value block in the AGC unit. In order to provide rapid adaptation of the control system to a rapid increase in ship motions, for example, if the ship turns from being head-on to the prevailing wave direction to being beam-on, the AGC overload filter time constant $K_f$ may be made non-symmetrical. In other words, the value of $K_f$ may be larger for positive input to the $K_f$ block, therefore, negative inputs. In this way, an increase in the overload value (positive input to the $K_f$ block) produces a rapid increase in the filtered overload value, while a decrease in the overload value (negative input to the $K_f$ block) produces a slower reduction in the filtered overload value. In this way, the AGC section responds rapidly to the move excessive overloads, whilst preventing rapid alteration of the roll control law gain.

It will also be understood that the AGC controller may be used for controlling a plurality of motions, i.e. more than 3 or 4 degress of freedom. In addition, it will be appreciated that other sensors may be used instead of accelerometers, for example, velocity sensors and the motions sensed may be linear or angular. In addition, although the system is described as being implemented in software, this is a preferred arrangement and it will be understood that the units hereinbefore described can also be implemented in hardware by a person of ordinary skill in the art.

It will also be understood that where multiple loops are being controlled simultaneously, for example, roll and pitch, the fact that the AGO unit makes the operation of the system more linear reduces the interactions between the loops. In addition, the motions of the ship in different controlled axis can be measured and the available fin power allocated according to the relative measurements in each axis. This allows the use of fin power to be maximised according to the sea conditions and the loading condition of the ship.

The system and apparatus hereinbefore described may be incorporated in a vessel during construction or it may be retrofitted to existing vessels. In particular, the AGO controller may be interfaced with existing vessel control system if the vessel control law used is capable of accepting a variable gain.

An advantage of the present invention is that the AGC controller allows a stabilisation system designer to trade off performance against power consumption. It can provide better performance in rough weather than a conventional controller using the same drive system or it can provide the same performance with a smaller drive system. The AGC controller can easily be extended to allow multiple control loops to use the same set of stabilisers with much reduced inter-loop interference compared with fixed gain controllers. This increases the performance of the control loop. Furthermore, the AGC controller allows available stabilisation capacity to be allocated between multiple control loops to try to maximise overall stabilisation according to some pro-set criterion.

The AGC controller has applicability to stabilisation systems in a variety of ship and floating vessel designs, and although the AGC sub-system has the effect of reducing the control loop gain it actually reduces the shipper vessel motions below those achieved with the conventional control law because the phase lag between the demanded and the actual fin angles is reduced and because the generation of the harmonics of the demanded fin angle is also much reduced.

We claim:

1. A vessel motion stablisation system for stabilizing at least one motion of a vessel having a plurality of actuatable vessel stabilising elements, said stabilising system comprising:

motion sensing elements for sensing a parameter representative of the vessel motion to be stabilised and generating a motion signal refecting said sensed parameter, control law means for receiving said motion signal and for processing said motion signal to provide an unlimited stabilising element demand signal, automatic gain control element for receiving a signal representative of said unlimited stabilising element demand signal and for receiving a signal representative of an actual stabilising element condition, said automatic gain control element including means for comparing the unlimited control law demand signal with the signal representative of the stabilising element condition and providing an error value, and signal processing means for processing said error value to provide automatic gain control value, means for combining the gain control value with the unlimited demand signal to provide a limited or actual demand signal for controlling the motion of said motion stabilising element.

2. A system as claimed in claim 1 wherein said automatic gain control element includes absolute error detecting means for determining the absolute error between the stabiliser demand signal and the actual stabiliser signal, filter means coupled to the output of the absolute error detecting means, said filter means having a filter input and a filter output and having a feedback loop from the filter output to the filter input, filter gain control means coupled to the filter output to provide a filter loop gain value, and gain limiting means coupled to output of said filter gain control means for limiting the loop gain value of the automatic gain control element to a value between a maximum and a minimum.

3. A system as claimed in claim 2 wherein said gain limiting means limits a maximum demand angle to a predetermined value, for example, plus or minus 25°.

4. A system as claimed in claim 1 wherein the vessel is a ship and the vessel stabilising elements are fins which are hydraulically or electrically actuatable.

5. A system as claimed in claim 4 wherein the motion detecting element are selected from the group consisting of: accelerometers, rate sensors and angle sensors, and the motion controlled is the roll motion of the ship.

6. A vessel stabilising system for stabilising the motion of a vessel, the vessel having a plurality of vessel motions to be controlled simultaneously, and the vessel having a plurality of actuatable vessel stabilising elements, each vessel stabilising element having one of a position sensing means and a motion sensing means for providing an output signal representative of the respective position or motion of the stabilising element, said vessel stabilising system comprising:

signal weighting means coupled to said sensing means for receiving said output signals representative of the position or motion of said stabilising elements, said weighting means including means for weighting the proportion of available power to be set for a particular vessel motion control law according to pre-determined criteria, and for generating weighted vessel motion components, error detecting means coupled to each stabilising element for receiving and coupling a demand signal and an actual signal from each vessel stabilising element and for providing an error signal, error signal comparison means coupled to each of said error detecting means for receiving said error signals and for coupling said error signals and selecting the largest error signal as an output signal, output signals processing means for filtering and amplifying said output signal to provide a gain value between a maximum and a minimum, power allocation means coupled to the output of said weighting means and to said signal processing means to receive said weighted vessel motion components and said gain value, said power allocation means including summing means for summing said weighted vessel motion components to provide a total value, and a plurality of vessel motion gain calculating means for determining respectively the gain of one of said respective vessel motions, said gain calculating means receiving said total value of the weighted components, the weighted component for a particular motion and the gain value between a maximum and a minimum, each gain calculating means providing a motion gain value which is fed to means to drive said motion stabilising element.

7. A system as claimed in claim 6 wherein the vessel is a ship and the vessel stabilising elements are fins.

8. A system as claimed in claim 7 wherein there are four fins which are used by three control laws.

9. A system as claimed in claim 6 wherein a motion sensor provides a motion signal from each controlled motion.

10. A system as claimed in claim 9 wherein the motion signals are weighted in accordance with control laws for each motion which depend on the vessel and installation-specific criteria.

11. A system as claimed in claim 10 wherein weighting is achieved by constants which are set at the design stage said constants being alterable in-situ to meet changing performance requirements.

12. A system as claimed in claim 6 wherein the maximum is 1.0 and the minimum is zero.

13. A method of controlling at least one motion of a vessel using a vessel stabilising system, the vessel having a plurality of vessel motions and vessel stabilising elements, said method comprising the steps of, providing an automatic gain control unit to monitor a signal representative of the actual motion of each stabilising element to be controlled, comparing the actual motion signal with a desired motion signal, and generating an automatic gain control value, and adjusting the gain for each motion signal by reducing the automatic gain control value to a level which the stabilising element can achieve.

* * * * *